(12) United States Patent
Yasuoka

(10) Patent No.: US 9,401,005 B2
(45) Date of Patent: Jul. 26, 2016

(54) IMAGE PROCESSING CIRCUIT, IMAGE PROCESSING METHOD, AND DISPLAY DEVICE USING THE SAME

(71) Applicant: SAMSUNG DISPLAY CO., LTD., Yongin, Gyeonggi-Do (KR)

(72) Inventor: Takashi Yasuoka, Yokohama (JP)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 435 days.

(21) Appl. No.: 14/082,363

(22) Filed: Nov. 18, 2013

(65) Prior Publication Data

US 2014/0140611 A1    May 22, 2014

(30) Foreign Application Priority Data

Nov. 19, 2012  (JP) .................................. 2012-253598

(51) Int. Cl.
*G06K 9/32* (2006.01)
*G06T 3/40* (2006.01)

(52) U.S. Cl.
CPC ..................................... *G06T 3/4007* (2013.01)

(58) Field of Classification Search
CPC ..................................................... G06T 3/4007
USPC ......................................................... 382/300
See application file for complete search history.

(56) References Cited

FOREIGN PATENT DOCUMENTS

| JP | 2005-267119 A | | 9/2005 | |
|---|---|---|---|---|
| JP | 2005267119 A | * | 9/2005 | ............... G06T 7/40 |
| JP | 2007-181189 A | | 7/2007 | |
| JP | 2007181189 A | * | 7/2007 | ............ H04N 1/409 |
| JP | 2009-268021 A | | 11/2009 | |
| JP | 2011-029908 A | | 2/2011 | |
| JP | 2011029908 A | * | 2/2011 | ............... H04N 1/46 |
| JP | 2012-083830 A | | 4/2012 | |

* cited by examiner

*Primary Examiner* — Gregory F Cunningham
(74) *Attorney, Agent, or Firm* — Lee & Morse, P.C.

(57) ABSTRACT

An image processing circuit includes a determination unit configured to classify the input image data into a first image area being a gradation area, a second image area being a non-gradation area, or a third image area being an intermediate area between the gradation area and the non-gradation area; a first pixel interpolation unit configured to generate a first output pixel value interpolated by applying a theoretically calculated coefficient to a pixel value of the input image data; a second pixel interpolation unit configured to generate a second output pixel value interpolated by applying a coefficient obtained by learning to the pixel value of the input image data; and a mixing unit configured to output the first output pixel value, the second output pixel value, or a third output pixel value, obtained by processing the first and second output pixel values, according to a classification result of the determination unit.

12 Claims, 7 Drawing Sheets x4

IMAGE PROCESSING CIRCUIT, IMAGE PROCESSING METHOD, AND DISPLAY DEVICE USING THE SAME

CROSS-REFERENCE TO RELATED APPLICATION

Japanese Patent Application No. 2012-253598, filed on Nov. 19, 2012, in the Japanese Intellectual Property Office, and entitled: "IMAGE PROCESSING CIRCUIT, IMAGE PROCESSING METHOD, AND DISPLAY DEVICE USING THE SAME," is incorporated by reference herein in its entirety.

BACKGROUND

1. Field

Embodiments described herein relate to an image processing circuit, an image processing method, and a display device using the same, and, more particularly, relate to an image processing circuit capable of reducing deterioration of an image in an image contour, a texture area, or a gradation area when low-definition image data is converted into high-definition image data, an image processing method thereof, and a display device using the same.

2. Description of the Related Art

In recent years, a large and high-definition display device has been come into wide use. However, a demand or treatment on a further large and high-definition display device becomes continuous. The large and high-definition display device essentially necessitates interpolation for magnifying image data. Interpolation methods for magnifying image data may generally include a Bi-Linear method, Bi-Cubic method, a Lanczos method, etc. Using such method, edges displayed on a larger and/or higher definition display device may be blurred or jaggy. To solve such problems, a method is proposed which determines an interpolation coefficient by learning. Using the learning method, in a contour or texture area, image quality is improved as compared with the other interpolation methods. However, since each reference pixel has a frequency component, using the learning method may result in degradation of image (e.g., a striped pattern) seen by a viewer in a gradation area (e.g., an area where a variation in a difference between adjacent pixels is low).

SUMMARY

One aspect of embodiments is directed to provide an image processing circuit which defines a rectangular lattice formed by a plurality of pixels, constituting input image data and arranged in a two-dimensional structure, and interpolates pixels at an area in the rectangular lattice to provide output image data obtained by magnifying the input image data, the image processing circuit comprising a determination unit configured to classify the input image data into a first image area being a gradation area, a second image area being a non-gradation area or a third image area being an intermediate area between the gradation area and the non-gradation area; a first pixel interpolation unit configured to generate a first output pixel value interpolated by applying a theoretically calculated coefficient to a pixel value of the input image data; a second pixel interpolation unit configured to generate a second output pixel value interpolated by applying a coefficient obtained by learning to the pixel value of the input image data; and a mixing unit configured to output the first output pixel value when the input image data is determined as the first image area by the determination unit, the second output pixel value when the input image data is determined as the second image area by the determination unit, or a third output pixel value, obtained by processing the first and second output pixel values, when the input image data is determined as the third image area by the determination unit.

In the image processing circuit, the determination unit may have a first threshold value and a second threshold value, and may obtain a convexo-concave level by processing pixel values included in the rectangular lattice. When the convexo-concave level is less than the first threshold value, the determination unit classifies the input image data into the first image area and the mixing unit outputs the first output pixel value. When the convexo-concave level is more than the second threshold value, the determination unit classifies the input image data into the second image area and the mixing unit outputs the second output pixel value. When the convexo-concave level is more than the first threshold value and less than the second threshold value, the determination unit classifies the input image data into the third image area and the mixing unit outputs the third output pixel value.

In the image processing circuit, the third output pixel value may be obtained by adding a product of a second ratio obtained by subtracting a first ratio obtained from the convexo-concave level and the first and second threshold values from 1 and the first output pixel value and a product of the first ratio and the second output pixel value.

The convexo-concave level may be a maximum value, a minimum value, or an average value of absolute values obtained by performing quadratic differentials on the pixel values included in the rectangular lattice; a maximum value, a minimum value, or an average value of absolute values on a high-frequency component using a high pass filter; or a maximum value, a minimum value, or an average value of absolute values on a high-frequency component using a discrete Fourier transform, and may be obtained by assigning weights to the absolute values obtained by performing quadratic differential on the pixel values, the absolute values on a high-frequency component using a high pass filter, or the absolute values on a high-frequency component using a discrete Fourier transform.

Another aspect of embodiments is directed to provide an image processing method which defines a rectangular lattice formed by a plurality of pixels, constituting input image data and arranged in a two-dimensional structure, and interpolates pixels at an area in the rectangular lattice to provide output image data obtained by magnifying the input image data, the image processing method comprising classifying the input image data into a first image area being a gradation area, a second image area being a non-gradation area or a third image area being an intermediate area between the gradation area and the non-gradation area; generating a first output pixel value interpolated by applying a theoretically calculated coefficient to a pixel value of the input image data; generating a second output pixel value interpolated by applying a coefficient obtained by learning to the pixel value of the input image data; and outputting the first output pixel value when the input image data is determined as the first image area, the second output pixel value when the input image data is determined as the second image area, or a third output pixel value, obtained by processing the first and second output pixel values, when the input image data is determined as the third image area.

In the image processing method, classifying may use a first threshold value and a second threshold value and may include obtaining a convexo-concave level by processing pixel values included in the rectangular lattice. When the convexo-concave level is less than the first threshold value, the input image data is classified into the first image area and the first output pixel value is output. When the convexo-concave level is more than the second threshold value, the input image data is classified into the second image area and the second output pixel value is output. When the convexo-concave level is more than the first threshold value and less than the second threshold value, the input image data is classified into the third image area and the third output pixel value is output.

The third output pixel value may be obtained by adding a product of a second ratio obtained by subtracting a first ratio obtained from the convexo-concave level and the first and second threshold values from 1 and the first output pixel value and a product of the first ratio and the second output pixel value.

The convexo-concave level may be a maximum value, a minimum value or an average value of absolute values obtained by performing quadratic differential on the pixel values included in the rectangular lattice; a maximum value, a minimum value or an average value of absolute values on a high-frequency component using a high pass filter; or a maximum value, a minimum value or an average value of absolute values on a high-frequency component using a discrete Fourier transform, and may be obtained by assigning weights to the absolute values obtained by performing quadratic differential on the pixel values, the absolute values on a high-frequency component using a high pass filter, or the absolute values on a high-frequency component using a discrete Fourier transform.

Another aspect of embodiments is directed to provide a display device which defines a rectangular lattice formed by a plurality of pixels, constituting input image data and arranged in a two-dimensional structure, and interpolates pixels at an area in the rectangular lattice to display output image data obtained by magnifying the input image data, the display device comprising a display unit; an image processing circuit configured to perform image processing on the input image data to provide output image data processed; a data driver configured to output the output image data from the image processing circuit to the display unit; and a gate driver configured to output a driving signal to the display unit, wherein the image process circuit classifies the input image data into a first image area being a gradation area, a second image area being a non-gradation area or a third image area being an intermediate area between the gradation area and the non-gradation area, generates a first output pixel value interpolated by applying a theoretically calculated coefficient to a pixel value of the input image data, generates a second output pixel value interpolated by applying a coefficient obtained by learning to the pixel value of the input image data, and outputs the first output pixel value when the input image data is determined as the first image area, the second output pixel value when the input image data is determined as the second image area, or a third output pixel value, obtained by processing the first and second output pixel values, when the input image data is determined as the third image area, and wherein the display unit displays an image based on the output image data according to the driving signal.

In the display device, the image processing circuit may have a first threshold value and a second threshold value and obtains a convexo-concave level by processing pixel values included in the rectangular lattice, wherein when the convexo-concave level is less than the first threshold value, the image processing circuit classifies the input image data into the first image area and outputs the first output pixel value, wherein when the convexo-concave level is more than the second threshold value, the image processing circuit classifies the input image data into the second image area and outputs the second output pixel value, and wherein when the convexo-concave level is more than the first threshold value and less than the second threshold value, the image processing circuit classifies the input image data into the third image area and outputs the third output pixel value.

In the display device, the third output pixel value may be obtained by adding a product of a second ratio obtained by subtracting a first ratio obtained from the convexo-concave level and the first and second threshold values from 1 and the first output pixel value and a product of the first ratio and the second output pixel value.

In the display device, the convexo-concave level may be a maximum value, a minimum value, or an average value of absolute values obtained by performing quadratic differentials on the pixel values included in the rectangular lattice; a maximum value, a minimum value, or an average value of absolute values on a high-frequency component using a high pass filter; or a maximum value, a minimum value, or an average value of absolute values on a high-frequency component using a discrete Fourier transform, and may be obtained by assigning weights to the absolute values obtained by performing quadratic differential on the pixel values, the absolute values on a high-frequency component using a high pass filter, or the absolute values on a high-frequency component using a discrete Fourier transform.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
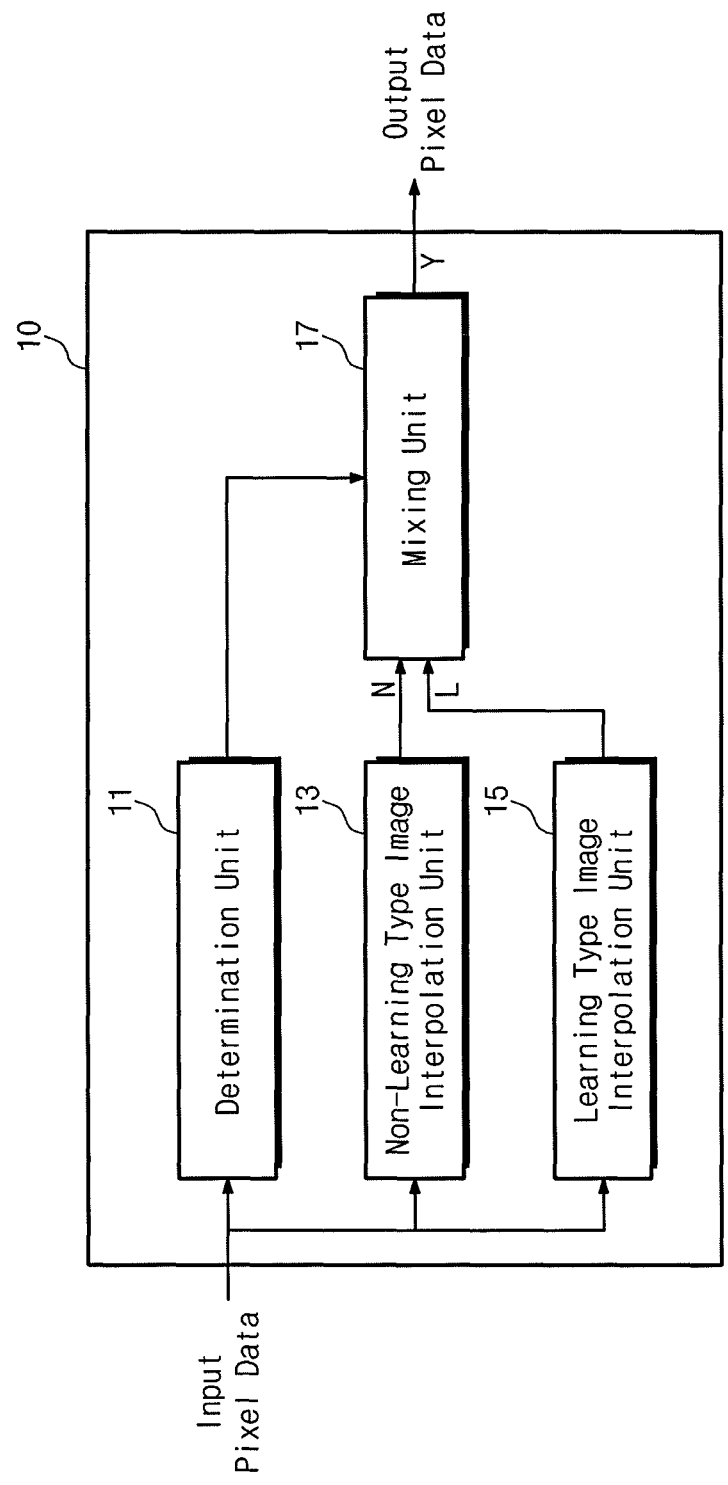
FIG. 1 illustrates a block diagram of an image processing circuit according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Below, an image processing circuit, an image processing method, and a display device using the same will be more fully described. However, changes or modification on the image processing circuit, the image processing method, and the display device using the same according to embodiments may be made.

As described above, in interpolation using a Bi-Linear method, a Bi-Cubic manner, or a Lanczos method, an edge in an image may be blurred or jaggy. Also, it is difficult to improve degradation of image of a gradation area using learning type interpolation. Since it is difficult to improve degradation of image of a gradation area using the learning type interpolation where an image characteristic is subdivided, embodiments are directed to using both theoretical interpolation on the Bi-Linear manner, the Bi-Cubic manner, and the Lanczos manner, and the learning type interpolation. That is, embodiments are directed to using both the learning type interpolation advantageous for interpolation at an image contour or a texture area and the interpolation based on the Bi-Linear method, the Bi-Cubic method, and the Lanczos method advantageous for interpolation at a gradation area.

As described in detail below, different interpolation methods are applied to an image contour or a texture area and to a gradation area. FIG. 1 is a block diagram schematically illustrating an image processing circuit 10 according to an embodiment. An image processing circuit 10 may include a determination unit 11, a non-learning type pixel interpolation unit 13 (or a first pixel interpolation unit), a learning type pixel interpolation unit 15 (or a second pixel interpolation unit), and a mixing unit 17.

The determination unit 11 classifies input image data into a gradation area (or a first image area), a non-gradation area (or a second image area), e.g., a contour or a texture area, or an intermediate area (or, a third image area) between the gradation area and the non-gradation area, e.g., a border there between. The non-learning type pixel interpolation unit 13 generates an interpolated pixel value (or a first output pixel value) by applying a theoretically obtained coefficient to a pixel value of the input image data. The learning type pixel interpolation unit 15 generates an interpolated pixel value (or a second output pixel value) by applying a coefficient obtained through learning to a pixel value of the input image data. Based on a classification result of the determination unit 11, the mixing unit 17 outputs the first or second output pixel value, or outputs the third output pixel value, obtained by processing the first and second output pixel values, for the intermediate area (or the third image area).

Figure 2:
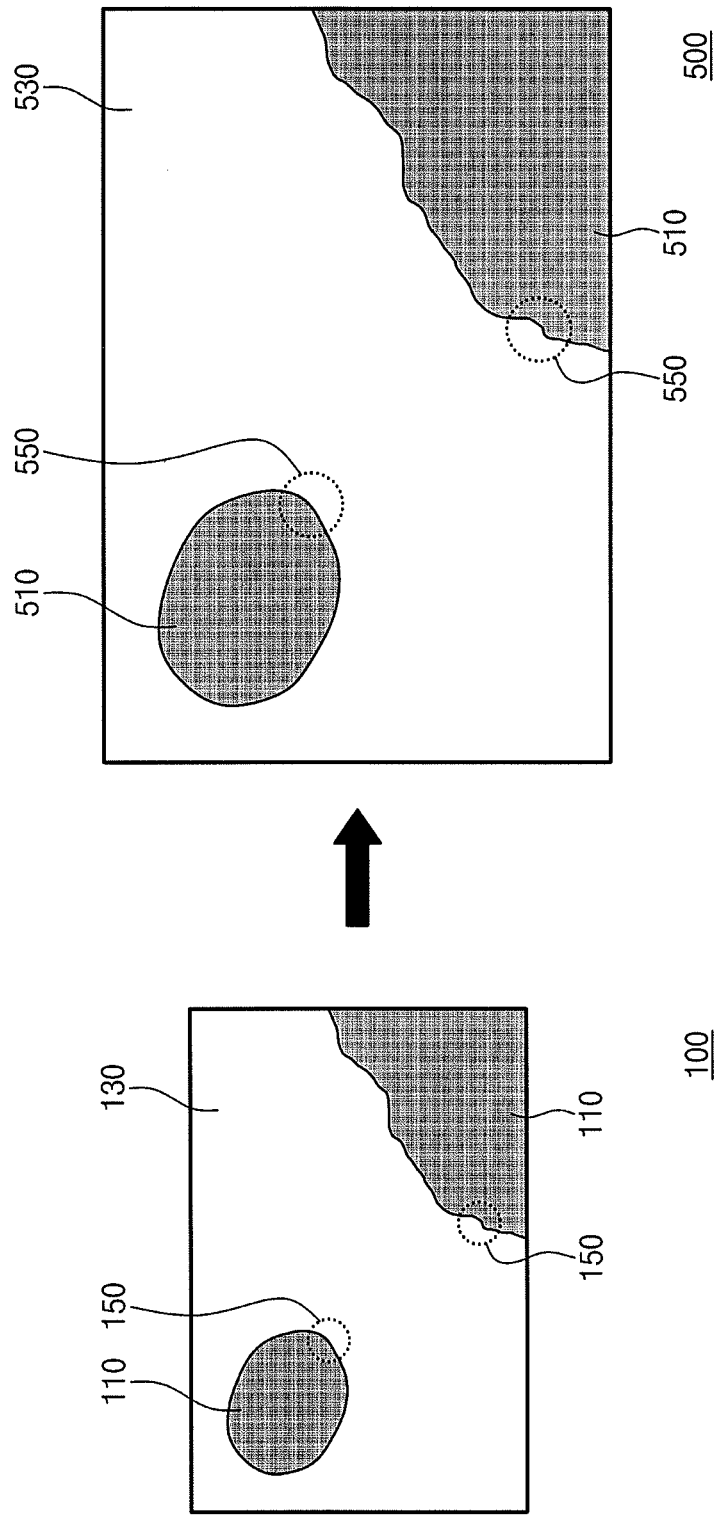
FIG. 2 illustrates a conceptual diagram for describing an image processing method according to an embodiment.

FIG. 2 illustrates a conceptual diagram for describing an image processing method according to an embodiment. A left plan view shows input image data 100 and a right plan view shows output image data 500 output from the image processing circuit 10. The input image data 100 is low-resolution image data that is generally provided by a wireless or wire communication means. The output image data 500 is high-resolution output image data that is interpolated by the image processing circuit 10. The input image data 100 includes both a gradation area 110 and a non-gradation area 130. A determination unit 11 classifies the input image data 100 into the gradation area 110 and the non-gradation area 130. However, since the input image data 100 includes an intermediate area 150 between the gradation area 110 and the non-gradation area 130, the determination unit 111 may classify the input image data 100 to any one of the gradation area 110, the non-gradation area 130, and the intermediate area 150 between the gradation area 110 and the non-gradation area 130.

As will be described below, in exemplary embodiments, the gradation area 110 is output as an area 510 that is pixel interpolated by a non-learning type pixel interpolation unit 13. The non-gradation area 130 is output as an area 530 that is pixel interpolated by a learning type pixel interpolation unit 15. The intermediate area 150 is output as an area 550 that is obtained by calculating a value processed by the non-learning type pixel interpolation unit 13 and a value processed by the learning type pixel interpolation unit 15 according to a ratio.

In exemplary embodiments, since the input image data 100 is divided into three areas, the determination unit 11 has a first threshold value and a second threshold value. Also, in a two-dimensional arrangement of pixels constituting the input image data 100, the determination unit 11 obtains a convexo-concave level by defining a rectangular lattice formed by a plurality of pixels and processing pixel values included in the rectangular lattice.

Figure 3:
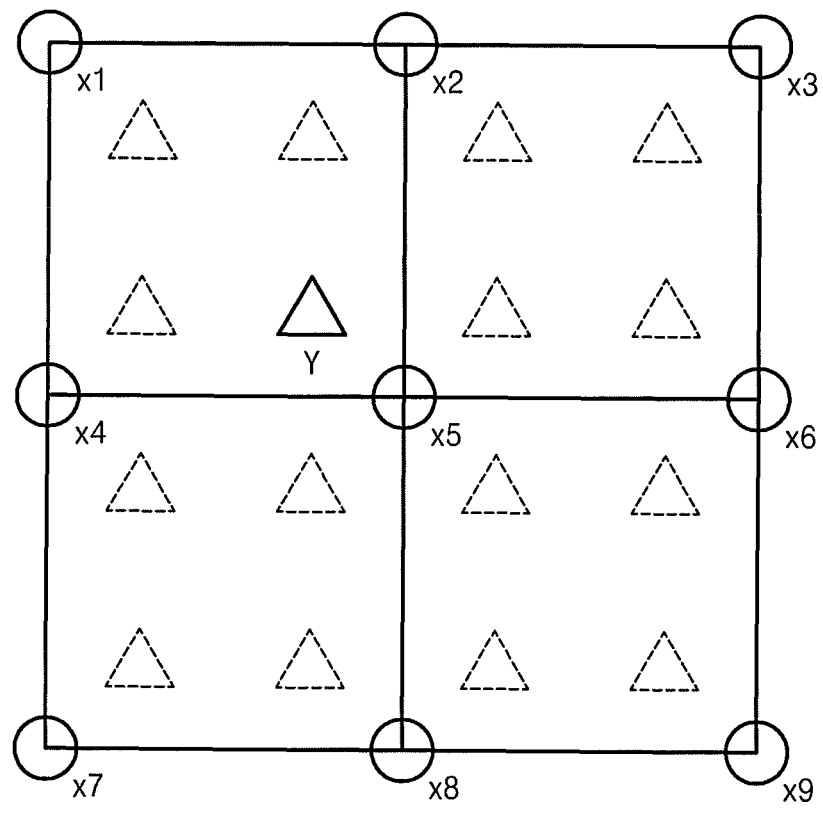
FIG. 3 illustrates a diagram for describing a relation between a pixel arrangement of an input image data and pixels interpolated by a determination unit, according to an embodiment.

FIG. 3 illustrates a diagram for describing a relation between a pixel arrangement of an input image data 100 and pixels interpolated by a determination unit 11, according to an embodiment. In exemplary embodiments, a rectangular lattice formed by pixels of input image data 100 is not limited to this disclosure. For example, the rectangular lattice may be defined as a 3-by-3 matrix.

In FIG. 3, for example, in a case where a lattice defined by pixels x1 to x9 is magnified (in case of high resolution), four pixels surrounded by pixels x1, x2, x4, and x5 are interpolated. In other words, four pixels around the pixel x5 are interpolated. In exemplary embodiments, whether this lattice is the gradation area 110, the non-gradation area 130, or the intermediate area 150 between the gradation area 110 and the non-gradation area 130 is determined according to 1) a maximum value, a minimum value, or an average value of absolute values obtained by performing quadratic differential on pixel values included in a rectangular lattice, 2) a maximum value, a minimum value, or an average value of absolute values on a high-frequency component using a high pass filter, or 3) a maximum value, a minimum value, or an average value of absolute values on a high-frequency component using a discrete Fourier transform.

(Classification Using Convexo-Concave Level Based on Absolute Value of Quadratic Differential)

Below, a classifying method using a maximum value of an absolute value of a quadratic differential is described as an embodiment where a convexo-concave level is obtained based on an absolute value of quadratic differentials. Absolute values of quadratic differential with respect to a lattice defined by pixels x1 to x9 shown in FIG. 3 are as follows.

$$d2x(0)=|(x2-x1)-(x3-x2)|$$

$$d2x(1)=|(x5-x4)-(x6-x5)|$$

$$d2x(2)=|(x8-x7)-(x9-x8)|$$

$$d2y(0)=|(x4-x1)-(x7-x4)|$$

$$d2y(1)=|(x5-x2)-(x8-x5)|$$

$$d2y(2)=|(x6-x3)-(x9-x6)|$$

A maximum value d2_max of the absolute values of the quadratic differentials is obtained by the following equation 1.

$$d2\_max=max(w1*d2x(0),w2*d2x(1),w3*d2x(2), w4*d2y(0),w5*d2y(1),w6*d2y(2)) \quad (1)$$

Here, w1 to w6 indicate weights on the absolute values of the quadratic differentials. In exemplary embodiments, a maximum value may be determined after assigning weights to the absolute values of the quadratic differentials. For example, a weight of a center of the lattice may be relatively large, while weights around the lattice may be relatively small. Through this weight assigning manner, the determination unit 11 may classify the input image data 100 into three areas.

The determination unit 11 compares the obtained maximum value with a first threshold value Th1 and a second threshold value Th2, respectively. If the maximum value is smaller than the first threshold value Th1, the determination unit 11 determines an input pixel value as being in the gradation area 110. If the maximum value is larger than the second threshold value Th2, the determination unit 11 determines the input pixel value is in the non-gradation area 130. If the maximum value is larger than the first threshold value Th1 but smaller than the second threshold value Th2, the determination unit 11 determines the input pixel value is in the intermediate area 150 between the gradation area 110 and the non-gradation area 130. In exemplary embodiments, the determination unit 11 classifies image data 100 of each frame into three areas. As described above, the determination unit 11 according to an embodiment classifies input image data 100 into three areas by performing quadratic differential on pixel values based on a rectangular lattice formed by pixels and obtaining a convexo-concave level as an absolute value. Similarly, a minimum value or an average value of an absolute value of the quadratic differential may be used as the convexo-concave level, with different threshold values applied by the determination unit 11 according to an embodiment to classify input image data 100 into three areas according to the same manner as described above.

(Classification Using Convexo-Concave Level Based on Absolute Value of High-Frequency Component Using High Pass Filter)

Below, a classifying method using a maximum value of an absolute value of a high-frequency component using a high pass filter is described as an embodiment where a convexo-concave level is obtained based on an absolute value of a high-frequency component using a high pass filter. A modified embodiment of classifying image data through the determination unit 11 is described as a classifying method utilizing an absolute value of a high-frequency component using a high pass filter. The following values are obtained by applying a high pass filter to a lattice defined by pixels x1 to x9 shown in FIG. 3.

$$Hx(0)=|-\tfrac{1}{4}\cdot x1+\tfrac{1}{2}\cdot x2-\tfrac{1}{4}\cdot x3|$$

$$Hx(1)=|-\tfrac{1}{4}\cdot x4+\tfrac{1}{2}\cdot x5-\tfrac{1}{4}\cdot x6|$$

$$Hx(2)=|-\tfrac{1}{4}\cdot x7+\tfrac{1}{2}\cdot x8-\tfrac{1}{4}\cdot x9|$$

$$Hy(0)=|-\tfrac{1}{4}\cdot x1+\tfrac{1}{2}\cdot x4-\tfrac{1}{4}\cdot x7|$$

$$Hy(1)=|-\tfrac{1}{4}\cdot x2+\tfrac{1}{2}\cdot x5-\tfrac{1}{4}\cdot x8|$$

$$Hy(2)=|-\tfrac{1}{4}\cdot x3+\tfrac{1}{2}\cdot x6-\tfrac{1}{4}\cdot x9|$$

A maximum value H_max of an absolute value of a high frequency component using a high pass filter is obtained by the following equation 2.

$$H\_max=max(w1*Hx(0),w2*Hx(1),w3*Hx(2),w4*Hy(0),w5*Hy(1),w6*Hy(2)) \quad (2)$$

Here, w1 to w6 indicate weights on the absolute values of a high frequency component using a high pass filter. In exemplary embodiments, it is desirable to obtain a maximum value after assigning a weight to an absolute value of a high frequency component using a high pass filter. For example, a weight of a center of the lattice may be relatively large, while weights around the lattice may be relatively small. Through this weight assigning manner, the determination unit 11 may classify the input image data 100 into three areas.

The determination unit 11, as described above, compares the obtained maximum value with the first threshold value Th1 and the second threshold value Th2, respectively. The determination unit 11 according to an embodiment may classify input image data 100 into three areas by obtaining an absolute value of a high frequency component using a high pass filter based on a rectangular lattice formed by pixels. Similarly, a minimum value or an average value of an absolute value of the high frequency component using a high pass filter may be used as the convexo-concave level, with different threshold values applied by the determination unit 11 according to an embodiment to classify input image data 100 into three areas according to the same manner as described above.

As described above, a non-learning type pixel interpolation unit 13 generates a pixel value interpolated by applying a theoretically calculated coefficient to pixel values of input image data. The non-learning type pixel interpolation unit 13 performs interpolation on pixels using well-known interpolation techniques such as a Bi-Linear manner, a Bi-Cubic manner, a Lanczos manner, etc. Theory-based pixel interpolation is performed using a well-known method disclosed in the aforementioned patent reference The learning type pixel interpolation unit 15, as described above, generates a pixel value interpolated by applying a coefficient obtained by learning to pixel values of input image data. In an image processing circuit 10 according to an embodiment, pixel interpolation by the non-learning type pixel interpolation unit 13, pixel interpolation by the learning type pixel interpolation unit 15, and classification by the determination unit 11 may be performed simultaneously. While the non-learning type pixel interpolation unit 13 or the learning type pixel interpolation unit 15 may perform pixel interpolation from an input pixel value based on a classification result of the determination unit 11, simultaneous operation improves processing speed.

If a pixel value is determined as the gradation area 110 by the determination unit 11, the mixing unit 17 outputs a pixel value interpolated by applying a theoretically calculated coefficient. If a pixel value is determined as the non-gradation area 130 by the determination unit 11, the mixing unit 17 outputs a pixel value interpolated by applying a coefficient obtained by learning.

If a pixel value is determined as an intermediate area 150 between the gradation area 110 and the non-gradation area 130 by the determination unit 11, the mixing unit 17 adds and outputs a product of a pixel value, interpolated by applying the theoretically calculated coefficient, and a ratio (or, a second ratio) obtained by subtracting a ratio (or, a first ratio) obtained from an obtained maximum value and first and second threshold values from 1 and a product of the first ratio and a pixel value obtained by applying a coefficient obtained by learning.

That is, in the event that the determination unit 11 performs quadratic differential and obtains a maximum value as an absolute value, the mixing unit 17 calculates an interpolated pixel according to the following equation 3.

$$N*(1-(d2\_max-Th1)/(Th2-Th1))+L*(d2\_max-Th1)/(Th2-Th1) \quad (3)$$

In the equation 3, 'N' indicates a pixel value theoretically interpolated, and 'L' indicates a pixel value interpolated by learning. Thus, in the intermediate area 150, as d2_max approaches the first threshold value Th1, a ratio of N increases. As d2_max approaches the second threshold value Th2, a ratio of L increases.

In a case where the determination unit 11 obtains a maximum value of an absolute value of a high frequency component using a high pass filter, the mixing unit 17 calculates a pixel interpolated according to the following equation 4.

$$N*(1-(H\_max-Th1)/(Th2-Th1))+L*(H\_max-Th1)/(Th2-Th1) \quad (4)$$

In the equation 4, 'N' indicates a pixel value theoretically interpolated, and 'L' indicates a pixel value interpolated by learning. Thus, in the intermediate area 150, as H_max approaches the first threshold value Th1, a ratio of N increases. As H_max approaches the second threshold value Th2, a ratio of L increases.

Figure 4A:
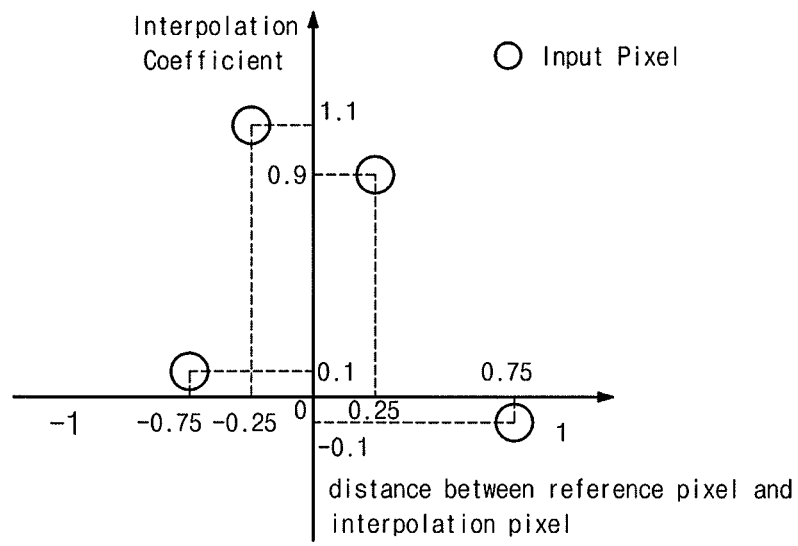
FIG. 4A illustrates a diagram for describing a relation between distances between input pixels (or, reference pixels) and interpolation pixels and interpolation coefficients obtained by learning.
Figure 4B:
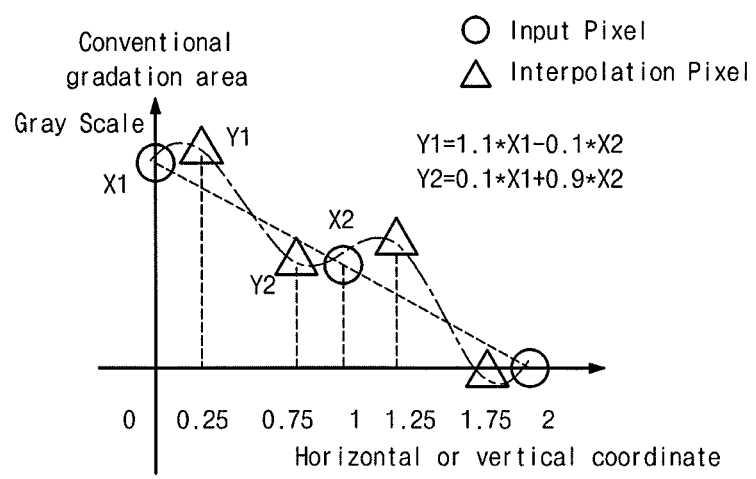
FIG. 4B illustrates a diagram for describing a relation between gray scale and a coordinate of interpolation pixels according to a conventional art where interpolation coefficients obtained by learning of a conventional art are applied to a gradation area 110.
Figure 4C:
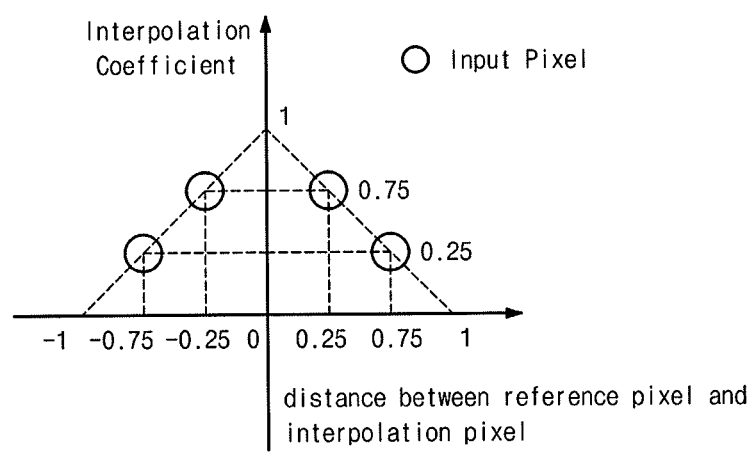
FIG. 4C is illustrates a diagram for describing a relation between distances between input pixels (or, reference pixels) and interpolation pixels and theoretically calculated interpolation coefficients.
Figure 4D:
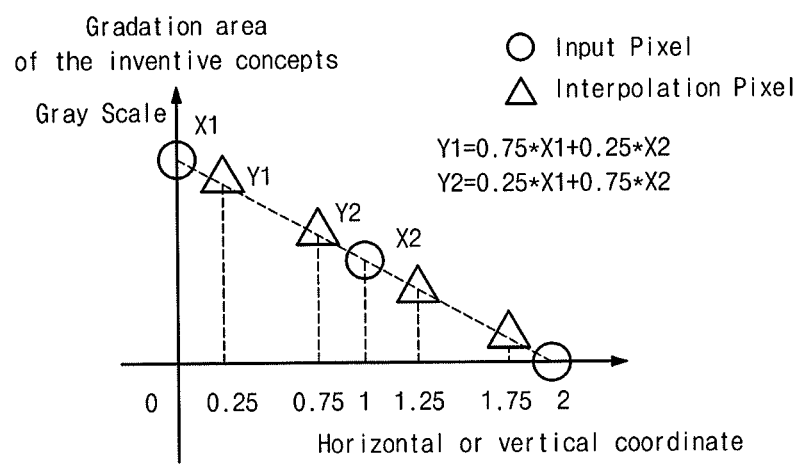
FIG. 4D is illustrates a diagram for describing a relation between gray scale and a coordinate of interpolation pixels according to an embodiment where theoretically calculated interpolation coefficients are applied to the gradation area 110.

As described above, the image processing circuit 10 interpolates pixels by classifying low-resolution image data into three areas and applying different interpolation methods to the three areas. FIG. 4A illustrates a relation between distances between input pixels (or, reference pixels) and interpolation pixels and interpolation coefficients obtained by learning. FIG. 4B illustrates a relation between gray scale and a coordinate of interpolation pixels when interpolation coefficients obtained by a conventional learning method are applied to a gradation area. FIG. 4C is illustrates a relation between distances between input pixels (or, reference pixels) and interpolation pixels and theoretically calculated interpolation coefficients. FIG. 4D illustrates a relation between gray scale and a coordinate of interpolation pixels when theoretically calculated interpolation coefficients according to an embodiment are applied to the gradation area.

Figure 5A:
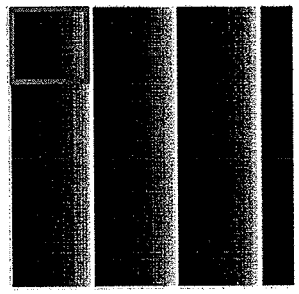
FIG. 5A illustrates a gradation area.
Figure 5B:
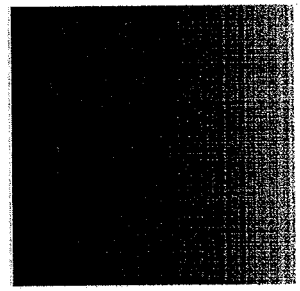
FIG. 5B illustrates a diagram of pixels interpolated by applying interpolation coefficients obtained by learning to the gradation area of FIG. 5A.
Figure 5C:
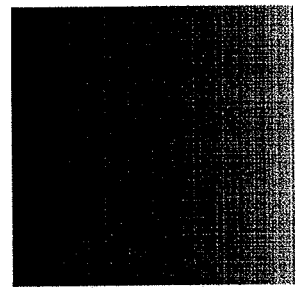
FIG. 5C illustrates a diagram of pixels interpolated by applying theoretically calculated interpolation coefficients according to an embodiment to the gradation area of FIG. 5A.

FIG. 5A illustrates a gradation area. FIG. 5B illustrates pixels interpolated by applying interpolation coefficients obtained by conventional learning to the gradation area of FIG. 5A. FIG. 5C illustrates pixels interpolated by applying theoretically calculated interpolation coefficients according to an embodiment to the gradation area of FIG. 5A.

As understood from FIGS. 4A to 5C, in an embodiment where theoretically calculated interpolation coefficients are applied to a gradation area, the gradation is magnified into a smooth gradation area, and degradation of image is reduced. Meanwhile, in a conventional example where an interpolation coefficient obtained by learning is applied to the gradation area, an image of a gradation area is degraded, and a striped pattern seen by a viewer is generated. In exemplary embodiments, if an interpolation coefficient obtained by learning is applied to contour of an image or a texture area (e.g., a non-gradation area 130), it is possible to implement an image having an effective texture at an edge.

(Display Device)

Figure 6:
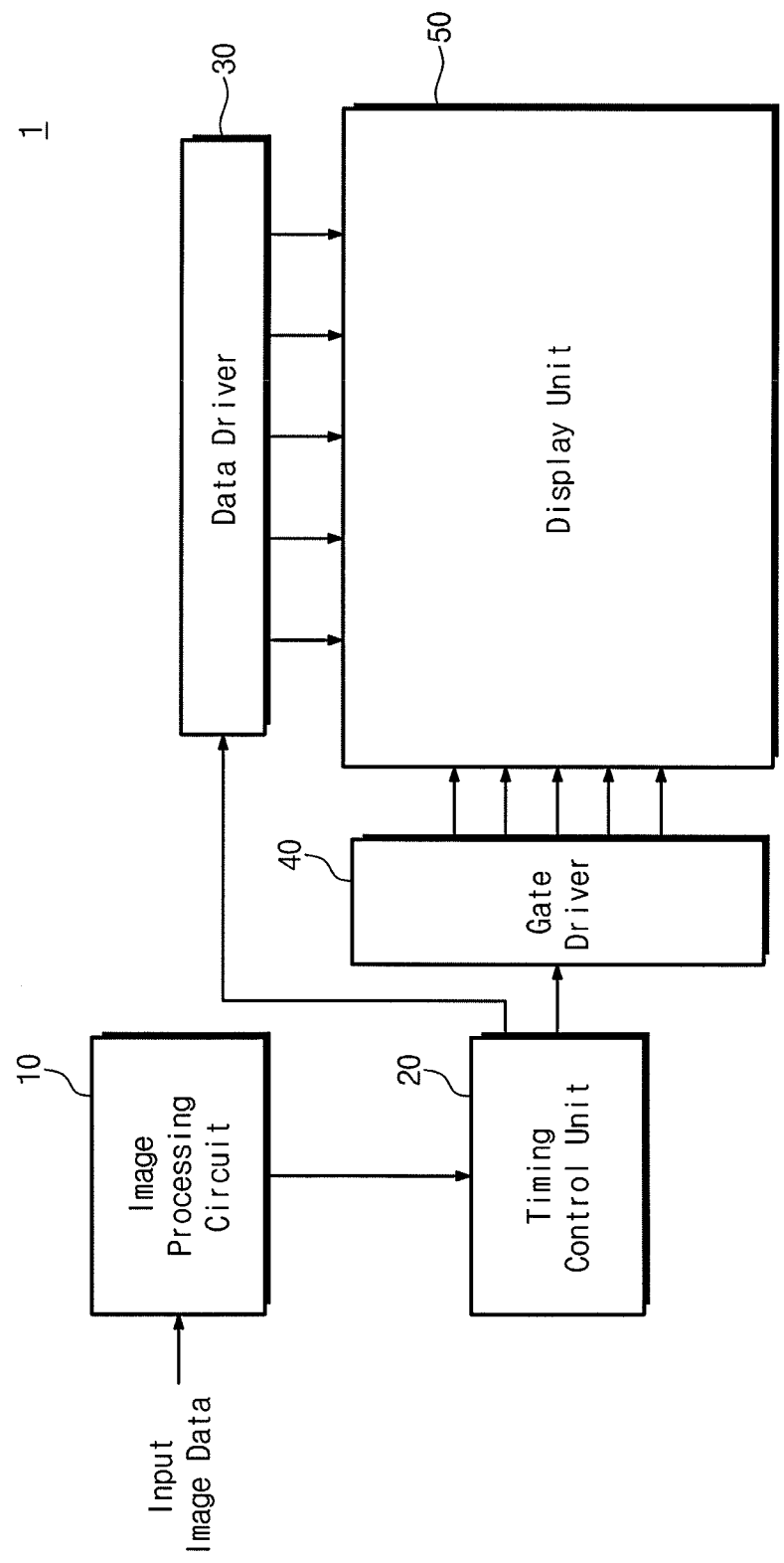
FIG. 6 illustrates a display device 1 according to an embodiment.

An image processing circuit according an embodiment is included in a display device. FIG. 6 illustrates a display device 1 according to an embodiment. A display device 1, for example, comprises an image processing circuit 10, a timing control unit 20, a data driver 30, a gate driver 40, and a display unit 50. As described above, the image processing circuit 10 performs image processing on first image data received to output second image data to be displayed.

The timing control unit 20 outputs and controls image data pixel-interpolated by the image processing circuit 10 to the data driver 30 and the gate driver 40. The data driver 30 outputs image data output from the image processing circuit 10 to the display unit 50. The gate driver 40 outputs a driving signal to the display unit 50.

The display device 1 includes the image processing circuit 10. In the display device 1, degradation of image is reduced by classifying input image data into three areas to appropriately perform pixel interpolation on each area, applying a theoretically calculated interpolation coefficient to a gradation area 110, and magnifying it into a smooth gradation area. Also, an image having an effective texture at an edge is implemented by applying an interpolation coefficient obtained by learning to a contour of an image or a texture area (e.g., a non-gradation area 130).

By way of summation and review, embodiments are directed to providing an image processing circuit capable of reducing deterioration of an image in an image contour, a texture area, or a gradation area when low-definition image data is converted into high-definition image data by using an appropriate interpolation in accordance with a type of image area being processed, an image processing method thereof, and a display device using the same. In particular, in accordance with embodiments, input image data is classified into a gradation area, a non-gradation area (or, a contour of image or a texture area), and an intermediate area between the gradation area and the non-gradation area, and pixel interpolation on each image area is appropriately performed. For example, input image data classified into the intermediate area may be determined according to a result of processing a convexo-concave level, obtained by processing pixel values of the input image data included in a rectangular lattice, and two threshold values. Further, a maximum value, a minimum value, or an average value may be obtained by assigning a weight to a value obtained by pixel values of input image data. Thus, it is possible to provide an image processing method capable of reducing deterioration of image.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An image processing circuit which defines a rectangular lattice formed by a plurality of pixels, constituting input image data and arranged in a two-dimensional structure, and interpolates pixels at an area in the rectangular lattice to provide output image data obtained by magnifying the input image data, the image processing circuit comprising:
    a determination unit configured to classify the input image data into a first image area being a gradation area, a second image area being a non-gradation area, or a third image area being an intermediate area between the gradation area and the non-gradation area;
    a first pixel interpolation unit configured to generate a first output pixel value interpolated by applying a theoretically calculated coefficient to a pixel value of the input image data;
    a second pixel interpolation unit configured to generate a second output pixel value interpolated by applying a coefficient obtained by learning to the pixel value of the input image data; and
    a mixing unit configured to output the first output pixel value when the input image data is determined as the first image area by the determination unit, the second output pixel value when the input image data is determined as the second image area by the determination unit, or a third output pixel value, obtained by processing the first and second output pixel values, when the input image data is determined as the third image area by the determination unit.

2. The image processing circuit as claimed in claim 1, wherein the determination unit has a first threshold value and a second threshold value and obtains a convexo-concave level by processing pixel values included in the rectangular lattice, wherein, when the convexo-concave level is less than the first threshold value, the determination unit classifies the input image data into the first image area and the mixing unit outputs the first output pixel value,
wherein, when the convexo-concave level is more than the second threshold value, the determination unit classifies the input image data into the second image area and the mixing unit outputs the second output pixel value, and
wherein, when the convexo-concave level is more than the first threshold value and less than the second threshold value, the determination unit classifies the input image data into the third image area and the mixing unit outputs the third output pixel value.

3. The image processing circuit as claimed in claim 2, wherein the third output pixel value is obtained by adding a product of a second ratio obtained by subtracting a first ratio obtained from the convexo-concave level and the first and second threshold values from 1 and the first output pixel value and a product of the first ratio and the second output pixel value.

4. The image processing circuit as claimed in claim 2, wherein the convexo-concave level is:
    a maximum value, a minimum value, or an average value of absolute values obtained by performing quadratic differentiation on the pixel values included in the rectangular lattice;
    a maximum value, a minimum value, or an average value of absolute values on a high-frequency component using a high pass filter; or
    a maximum value, a minimum value, or an average value of absolute values on a high-frequency component using a discrete Fourier transform; and
    obtained by assigning weights to the absolute values obtained by performing quadratic differential on the pixel values, the absolute values on a high-frequency component using a high pass filter, or the absolute values on a high-frequency component using a discrete Fourier transform.

5. An image processing method which defines a rectangular lattice formed by a plurality of pixels, constituting input image data and arranged in a two-dimensional structure, and interpolates pixels at an area in the rectangular lattice to provide output image data obtained by magnifying the input image data, the image processing method comprising:
    classifying the input image data into a first image area being a gradation area, a second image area being a non-gradation area, or a third image area being an intermediate area between the gradation area and the non-gradation area;
    generating a first output pixel value interpolated by applying a theoretically calculated coefficient to a pixel value of the input image data;
    generating a second output pixel value interpolated by applying a coefficient obtained by learning to the pixel value of the input image data; and
    outputting the first output pixel value when the input image data is determined as the first image area, the second output pixel value when the input image data is determined as the second image area, or a third output pixel value, obtained by processing the first and second output pixel values, when the input image data is determined as the third image area.

6. The image processing method as claimed in claim 5, wherein the classifying has a first threshold value and a second threshold value and comprises obtaining a convexo-concave level by processing pixel values included in the rectangular lattice, wherein, when the convexo-concave level is less than the first threshold value, the input image data is classified into the first image area and the first output pixel value is output, wherein, when the convexo-concave level is more than the second threshold value, the input image data is classified into the second image area and the second output pixel value is output, and wherein, when the convexo-concave level is more than the first threshold value and less than the second threshold value, the input image data is classified into the third image area and the third output pixel value is output.

7. The image processing method as claimed in claim 6, wherein the third output pixel value is obtained by adding a product of a second ratio obtained by subtracting a first ratio obtained from the convexo-concave level and the first and second threshold values from 1 and the first output pixel value and a product of the first ratio and the second output pixel value.

8. The image processing method as claimed in claim 6, wherein the convexo-concave level is:
- a maximum value, a minimum value, or an average value of absolute values obtained by performing quadratic differentiation on the pixel values included in the rectangular lattice;
- a maximum value, a minimum value or an average value of absolute values on a high-frequency component using a high pass filter; or
- a maximum value, a minimum value or an average value of absolute values on a high-frequency component using a discrete Fourier transform; and
- is obtained by assigning weights to the absolute values obtained by performing quadratic differential on the pixel values, the absolute values on a high-frequency component using a high pass filter, or the absolute values on a high-frequency component using a discrete Fourier transform.

9. A display device which defines a rectangular lattice formed by a plurality of pixels, constituting input image data and arranged in a two-dimensional structure, and interpolates pixels at an area in the rectangular lattice to display output image data obtained by magnifying the input image data, the display device comprising:
- a display unit;
- an image processing circuit configured to perform image processing on the input image data to provide output image data processed;
- a data driver configured to output the output image data from the image processing circuit to the display unit; and
- a gate driver configured to output a driving signal to the display unit, wherein the image process circuit classifies the input image data into a first image area being a gradation area, a second image area being a non-gradation area, or a third image area being an intermediate area between the gradation area and the non-gradation area, generates a first output pixel value interpolated by applying a theoretically calculated coefficient to a pixel value of the input image data, generates a second output pixel value interpolated by applying a coefficient obtained by learning to the pixel value of the input image data, and outputs the first output pixel value when the input image data is determined as the first image area, the second output pixel value when the input image data is determined as the second image area, or a third output pixel value, obtained by processing the first and second output pixel values, when the input image data is determined as the third image area, and wherein the display unit displays an image based on the output image data according to the driving signal.

10. The display device as claimed in claim 9, wherein the image processing circuit has a first threshold value and a second threshold value and obtains a convexo-concave level by processing pixel values included in the rectangular lattice, wherein, when the convexo-concave level is less than the first threshold value, the image processing circuit classifies the input image data into the first image area and outputs the first output pixel value, wherein, when the convexo-concave level is more than the second threshold value, the image processing circuit classifies the input image data into the second image area and outputs the second output pixel value, and wherein, when the convexo-concave level is more than the first threshold value and less than the second threshold value, the image processing circuit classifies the input image data into the third image area and outputs the third output pixel value.

11. The display device as claimed in claim 10, wherein the third output pixel value is obtained by adding a product of a second ratio obtained by subtracting a first ratio obtained from the convexo-concave level and the first and second threshold values from 1 and the first output pixel value and a product of the first ratio and the second output pixel value.

12. The display device as claimed in claim 10, wherein the convexo-concave level is:
- a maximum value, a minimum value, or an average value of absolute values obtained by performing quadratic differentiation on the pixel values included in the rectangular lattice;
- a maximum value, a minimum value or an average value of absolute values on a high-frequency component using a high pass filter; or
- a maximum value, a minimum value, or an average value of absolute values on a high-frequency component using a discrete Fourier transform; and
- is obtained by assigning weights to the absolute values obtained by performing quadratic differential on the pixel values, the absolute values on a high-frequency component using a high pass filter, or the absolute values on a high-frequency component using a discrete Fourier transform.

* * * * *